United States Patent
Su (10) Patent No.: US 11,822,439 B1
(45) Date of Patent: Nov. 21, 2023

(54) METHOD AND APPARATUS FOR OPTIMIZING OPEN BLOCK IN SOLID-STATE DRIVE, DEVICE, AND READABLE MEDIUM

(71) Applicant: INSPUR SUZHOU INTELLIGENT TECHNOLOGY CO., LTD., Jiangsu (CN)

(72) Inventor: Jun Su, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/039,233

(22) PCT Filed: Oct. 29, 2021

(86) PCT No.: PCT/CN2021/127406
§ 371 (c)(1),
(2) Date: May 27, 2023

(87) PCT Pub. No.: WO2023/279593
PCT Pub. Date: Jan. 12, 2023

(30) Foreign Application Priority Data

Jul. 6, 2021 (CN) .......................... 202110760844.6

(51) Int. Cl.
*G06F 11/14* (2006.01)
*G06F 3/06* (2006.01)

(52) U.S. Cl.
CPC .......... *G06F 11/1471* (2013.01); *G06F 3/064* (2013.01); *G06F 3/0619* (2013.01); *G06F 3/0659* (2013.01); *G06F 3/0679* (2013.01)

(58) Field of Classification Search
CPC .... G06F 11/1471; G06F 3/0619; G06F 3/064; G06F 3/0659; G06F 3/0679
See application file for complete search history.

(56) References Cited

U.S. PATENT DOCUMENTS 10,048,863 B1    8/2018  Goss et al.
10,114,557 B2 *  10/2018 Kotte .................. G06F 11/3034

FOREIGN PATENT DOCUMENTS

| CN | 109542349 A | 3/2019 |
| CN | 110389716 A | 10/2019 |
| CN | 111736765 A | 10/2020 |
| CN | 111831218 A | 10/2020 |
| CN | 113253943 A | 8/2021 |
| EP | 0628691 A1 | 12/1994 |

* cited by examiner

*Primary Examiner* — Nadeem Iqbal
(74) *Attorney, Agent, or Firm* — IPro, PLLC (57) ABSTRACT

A method and apparatus for optimizing an open block in a solid-state drive, a device, and a readable medium. The method includes: detecting, every preset time period, whether a block in a solid-state drive is in an open block state, and putting a detected block in the open block state into a table; monitoring in real time whether there is a new record in the table; in response to detecting that there is a new record in the table, determining whether a block in the new record has an abnormal power-off mark; and in response to the block in the new record has an abnormal power-off mark, filling a next layer of data of the block having the abnormal power-off mark with content in a preset format so as to seal the block.

20 Claims, 3 Drawing Sheets

METHOD AND APPARATUS FOR OPTIMIZING OPEN BLOCK IN SOLID-STATE DRIVE, DEVICE, AND READABLE MEDIUM

The present application claims the priority of the Chinese patent application filed on Jul. 6, 2021 before the China National Intellectual Property Administration with the application number of 202110760844.6 and the title of "METHOD AND APPARATUS FOR OPTIMIZING OPEN BLOCK IN SOLID-STATE DRIVE, DEVICE, AND READABLE MEDIUM", which is incorporated herein in its entirety by reference.

FIELD

The present application relates to the field of computers, and particularly relates to a method and apparatus for optimizing an open block in a solid-state disk, a device and a readable medium.

BACKGROUND

With the development and the extensive application of techniques such as the Internet, cloud computing and the Internet of Things, in human life, mass data are required to be processed and stored all the time, and the high-speed development of the information technology is raising higher requirements on the performance of the storage systems. Solid-state disks, because of their high read-write speed and low energy consumption, are extensively used. However, because the characteristics of the NANDs (solid-state disk) themselves are influenced by the electrical characteristics of the hardware, when a block in the NAND is not fully written, after a certain duration, the data of the finally written-in layer of the block become unstable, which is referred to as the open-block situation. In this case, the error correction of those data might fail with a high probability.

Conventionally, the common solution of the problem is to perform error correction by using a table or filling a layer of dummy data. However, the practical application of the above modes has some hidden dangers. In certain cases, even if the table error correction is used, there is still a certain probability with which the error correction fails.

SUMMARY

In view of the above, an object of the embodiments of the present application is to provide a method and apparatus for optimizing an open block in a solid-state disk, a device and a readable medium. The technical solutions of the present application may effectively solve the problem of the error correction of the open block, and prevent the affection on the performance, thereby enabling the performance of the solid-state disk to be more stable.

In order to achieve the above object, an aspect of the embodiments of the present application provides a method for optimizing an open block in a solid-state disk, and the method includes the steps of:

every preset duration, detecting whether a block in the solid-state disk is in a state of open block, and placing a block detected as in the state of open block into a table;

monitoring in real time whether a new record exists in the table;

in response to it being monitored that the new record exists in the table, determining whether a block in the new record has an abnormal powering-off mark; and in response to the block in the new record having the abnormal powering-off mark, filling a content of a predetermined format into a next layer of data of the block having the abnormal powering-off mark to seal the block.

According to an embodiment of the present application, the method further includes:

in response to the block in the new record not having the abnormal powering-off mark, filling a DUMMY content of a data type in a current block into a next layer of data of the current block.

According to an embodiment of the present application, the method further includes:

in response to it being detected that the solid-state disk is abnormally powered off, marking a block that is not fully written as an open block, filling a DUMMY content of an SLC data format into a next layer of data of the block marked as an open block to seal the block.

According to an embodiment of the present application, every preset duration, detecting whether the block in the solid-state disk is in the state of open block, and placing the block detected as in the state of open block into the table includes:

setting a timer, and, based on a time when the block starts to be written with data and a time when the timer arrives time, determining a maintaining duration of data of the block that is not fully written;

comparing the maintaining duration of the data of the block that is not fully written and a threshold duration; and in response to the maintaining duration of the data of the block that is not fully written being greater than the threshold duration, placing the block with the maintaining duration being greater than the threshold duration into the table.

According to an embodiment of the present application, in response to the block in the new record having the abnormal powering-off mark, filling the content of the predetermined format into the next layer of the data of the block having the abnormal powering-off mark to seal the block includes:

filling a DUMMY content of a SLC data format into the next layer of the data of the block having the abnormal powering-off mark to seal the block.

Another aspect of the embodiments of the present application further provides an apparatus for optimizing an open block in a solid-state disk, and the apparatus includes:

a detecting module, where the detecting module is configured for, every preset duration, detecting whether a block in the solid-state disk is in a state of open block, and placing a block detected as in the state of open block into a table;

a monitoring module, where the monitoring module is configured for monitoring in real time whether a new record exists in the table;

a determining module, where the determining module is configured for, in response to it being monitored that the new record exists in the table, determining whether a block in the new record has an abnormal powering-off mark; and a writing-in module, where the writing-in module is configured for, in response to the block in the new record having the abnormal powering-off mark, filling a content of a predetermined format into a next layer of data of the block having the abnormal powering-off mark to seal the block.

According to an embodiment of the present application, the writing-in module is further configured for:

in response to the block in the new record not having the abnormal powering-off mark, filling a DUMMY content of a data type in a current block into a next layer of data of the current block.

According to an embodiment of the present application, the apparatus further includes a marking module, and the marking module is configured for:

in response to it being detected that the solid-state disk is abnormally powered off, marking a block that is not fully written as an open block, filling a DUMMY content of an SLC data format into a next layer of data of the block marked as an open block to seal the block.

According to an embodiment of the present application, the detecting module is further configured for:

setting a timer, and, based on a time when the block starts to be written with data and a time when the timer arrives time, determining a maintaining duration of data of the block that is not fully written;

comparing the maintaining duration of the data of the block that is not fully written and a threshold duration; and in response to the maintaining duration of the data of the block that is not fully written being greater than the threshold duration, placing the block with the maintaining duration being greater than the threshold duration into the table.

According to an embodiment of the present application, the writing-in module is further configured for:

filling a DUMMY content of a SLC data format into the next layer of the data of the block having the abnormal powering-off mark to seal the block.

Another aspect of the embodiments of the present application further provides a computer device, and the computer device includes:

at least one processor; and a memory, where the memory stores a computer instruction that is executable in the processor, and the instruction, when executed by the processor, implements the operations of the method according to any one of the above embodiments.

Another aspect of the embodiments of the present application further provides a computer-readable storage medium, the computer-readable storage medium storing a computer program, where the computer program, when executed by a processor, implements the operations of the method according to any one of the above embodiments.

The present application has the following advantageous technical effect. The method for optimizing an open block in a solid-state disk according to the embodiments of the present application, by using the technical solution of, every preset duration, detecting whether a block in the solid-state disk is in a state of open block, and placing a block detected as in the state of open block into a table; monitoring in real time whether a new record exists in the table; in response to it being monitored that the new record exists in the table, determining whether a block in the new record has an abnormal powering-off mark; and in response to the block in the new record having an abnormal powering-off mark, filling a content of a predetermined format into a next layer of data of the block having the abnormal powering-off mark to seal the block, may effectively solve the problem of the error correction of the open block, and prevent the affection on the performance, thereby enabling the performance of the solid-state disk to be more stable.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art may obtain other embodiments according to these figures without paying creative work.

DETAILED DESCRIPTION

In order to make the objects, the technical solutions and the advantages of the present application clearer, the embodiments of the present application will be further described in detail with reference to the embodiments and the drawings.

Figure 1:
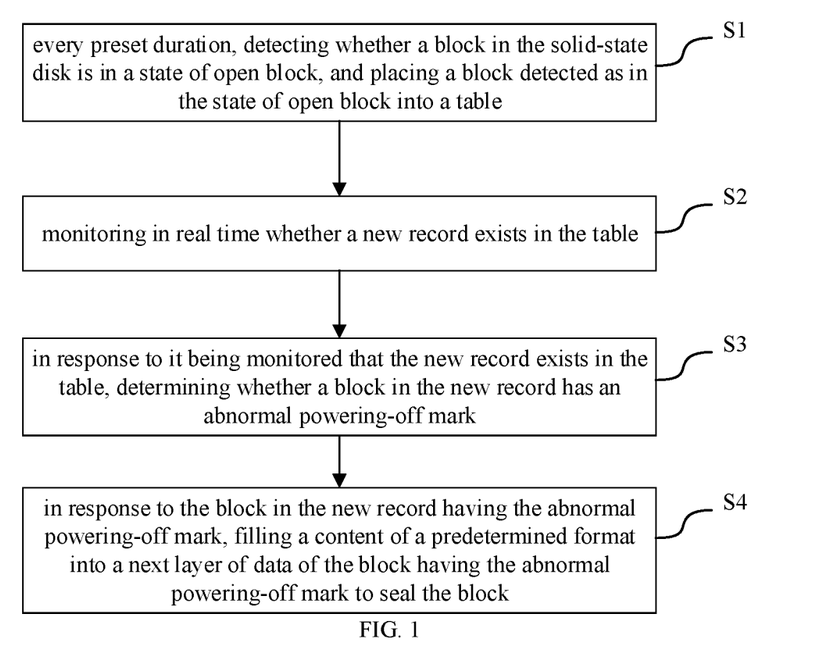
FIG. 1 is a schematic flow chart of a method for optimizing an open block in a solid-state disk according to an embodiment of the present application.

In order to achieve the above object, the first aspect of the embodiments of the present application provides an embodiment of a method for optimizing an open block in a solid-state disk. FIG. 1 shows a schematic flow chart of the method.

As shown in FIG. 1, the method may include the following operations:

S1: every preset duration, detecting whether a block in the solid-state disk is in a state of open block, and placing a block detected as in the state of open block into a table.

When a block in the solid-state disk is not fully written, after a certain duration, the data of the finally written-in layer of the block become unstable, which is referred to as the open-block situation. A timer may be provided, to sequentially determine the data maintaining duration of each of the blocks that are not fully written, where the data maintaining duration refers to the time difference between the time when the block starts to be written with data and the time point detected by the timer. Subsequently, the maintaining duration and a preset threshold duration are compared. When the maintaining duration exceeds the preset threshold duration, then it is determined that the block is an open block, and subsequently the information of the block is placed into a table. When the maintaining duration does not exceed the preset threshold duration, then the block is not an open block, no processing is performed, and it is required to wait for a next round of detection.

S2: monitoring in real time whether a new record exists in the table.

S3: in response to it being monitored that the new record exists in the table, determining whether the block in the new record has an abnormal powering-off mark.

When the new record is generated, it is required to determine whether the block in the new record has the abnormal powering-off mark, and when abnormal powering-off happens, the block is marked.

S4: in response to the block in the new record having the abnormal powering-off mark, filling a content of a predetermined format into a next layer of data of the block having the abnormal powering-off mark to seal the block.

When the block does not have the abnormal powering-off mark, a DUMMY content of a data type in the current block is filled into the next layer of the data of the current block. When the block has the abnormal powering-off mark, then a DUMMY content of a Single-Level Cell (SLC, i.e., 1 bit/unit) data format is filled into the next layer of the data of the block having the abnormal powering-off mark to seal the block, and the information of the block is saved into the configuration information.

The technical solutions of the present application may effectively solve the problem of the error correction of the open block, and prevent the affection on the performance, thereby enabling the performance of the solid-state disk to be more stable.

In an embodiment of the present application, the method further includes:

in response to the block in the new record not having the abnormal powering-off mark, filling a DUMMY content of a data type in a current block into a next layer of data of the current block. When the data type in the current block is data of the TLC format, then a DUMMY content of the TLC format is filled into the next layer of the data of the current block. When the data type in the current block is data of the SLC format, then a DUMMY content of the SLC format is filled into the next layer of the data of the current block.

In an embodiment of the present application, the method further includes:

in response to it being detected that the solid-state disk is abnormally powered off, marking a block that is not fully written as an open block, filling a DUMMY content of an SLC data format into a next layer of data of the block marked as an open block to seal the block. When abnormal powering-off of the solid-state disk happens, then all of the blocks that are not fully written are marked as an open block, subsequently a DUMMY content of an SLC data format is filled into the next layer of the data of the block marked as an open block to seal the block, and simultaneously the information of the block is saved into the configuration information. When the power is on again, the configuration information is detected. When it is detected that the block is sealed by using the DUMMY content of the SLC data format, then the DUMMY content of the SLC data format is deleted, and subsequently the block is treated with the normal process.

In an embodiment of the present application, the operation of, every preset duration, detecting whether the block in the solid-state disk is in the state of open block, and placing the block detected as in the state of open block into the table includes:

setting a timer, and, based on a time when the block starts to be written with data and a time when the timer arrives time, determining a maintaining duration of data of the block that is not fully written;

comparing the maintaining duration of the data of the block that is not fully written and a threshold duration; and in response to the maintaining duration of the data of the block that is not fully written being greater than the threshold duration, placing the block with the maintaining duration being greater than the threshold duration into the table.

In an embodiment of the present application, the operation of, in response to the block in the new record having the abnormal powering-off mark, filling the content of the predetermined format into the next layer of the data of the block having the abnormal powering-off mark to seal the block includes:

filling a DUMMY content of a SLC data format into the next layer of the data of the block having the abnormal powering-off mark to seal the block.

The technical solutions of the present application may effectively solve the problem of the error correction of the open block, and prevent the affection on the performance, thereby enabling the performance of the solid-state disk to be more stable.

It should be noted that a person skilled in the art may understand that all or some of the processes of the methods according to the above embodiments may be implemented by relative hardware according to an instruction from a computer program, the program may be stored in a computer-readable storage medium, and the program, when executed, may contain the processes of the embodiments of the method stated above. The storage medium may be a diskette, an optical disk, a Read-Only Memory (ROM), a Random Access Memory (RAM) and so on. The embodiments of the computer program may reach an effect the same as or similar to those of any of the above-described process embodiments corresponding thereto.

Furthermore, the method according to the embodiments of the present application may also be implemented as a computer program executed by a CPU, where the computer program may be stored in a computer-readable storage medium. The computer program, when executed by the CPU, executes the above-described functions defined in the method according to the embodiments of the present application.

Figure 2:
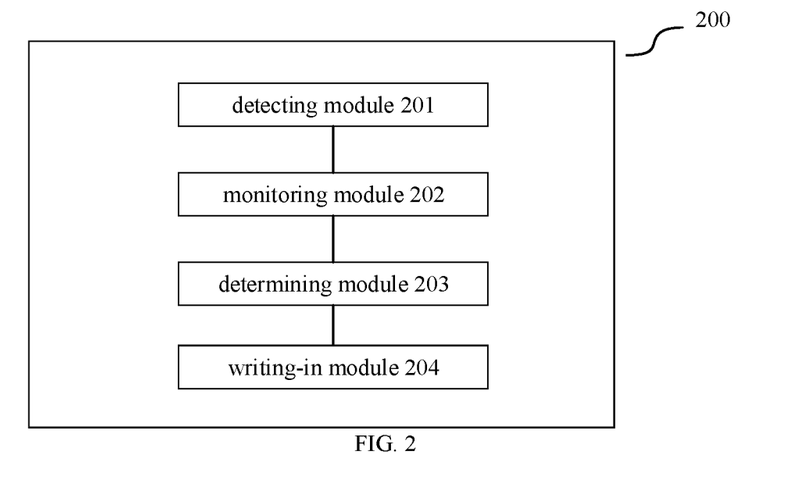
FIG. 2 is a schematic diagram of an apparatus for optimizing an open block in a solid-state disk according to an embodiment of the present application.

In order to achieve the above object, the second aspect of the embodiments of the present application provides an apparatus for optimizing an open block in a solid-state disk. As shown in FIG. 2, the apparatus 200 includes:

a detecting module 201, where the detecting module 201 is configured for, every preset duration, detecting whether a block in the solid-state disk is in a state of open block, and placing a block detected as in the state of open block into a table.

When a block in a solid-state disk is not fully written, after a certain duration, the data of the finally written-in layer of the block become unstable, which is referred to as the open-block situation. A timer may be provided, to sequentially determine the data maintaining duration of each of the blocks that are not fully written, among them, the data maintaining duration refers to the time difference between the time when the block starts to be written with data and the time point of the detecting by the timer. Subsequently, the maintaining duration and a preset threshold duration are compared. When the maintaining duration exceeds the preset threshold duration, then it is determined that the block is an open block, and subsequently the information of the block is placed into a table. When the maintaining duration does not exceed the preset threshold duration, then the block is not an open block, no processing is performed, and it is required to wait for the next round of detection.

A monitoring module 202, where the monitoring module 202 is configured for monitoring in real time whether a new record exists in the table.

A determining module 203, where the determining module 203 is configured for, in response to it being monitored that the new record exists in the table, determining whether a block in the new record has an abnormal powering-off mark.

When the new record is generated, it is required to determine whether the block in the new record has the abnormal powering-off mark, and when abnormal powering-off happens, the block is marked.

A writing-in module 204, where the writing-in module 204 is configured for, in response to the block in the new record having the abnormal powering-off mark, filling a content of a predetermined format into a next layer of data of the block having the abnormal powering-off mark to seal the block.

When the block does not have an abnormal powering-off mark, a DUMMY content of a data type in the current block is filled into the next layer of the data of the current block. When the block has the abnormal powering-off mark, then a DUMMY content of a Single-Level Cell (SLC, i.e., 1 bit/unit) data format is filled into the next layer of the data of the block having the abnormal powering-off mark to seal the block, and the information of the block is saved into the configuration information.

In an embodiment of the present application, the writing-in module is further configured for:

in response to the block in the new record not having the abnormal powering-off mark, filling a DUMMY content of a data type in a current block into a next layer of data of the current block. When the data type in the current block is data of the TLC format, then a DUMMY content of the TLC format is filled into the next layer of the data of the current block. When the data type in the current block is data of the SLC format, then a DUMMY content of the SLC format is filled into the next layer of the data of the current block.

In an embodiment of the present application, the apparatus further includes a marking module, where the marking module is configured for:

in response to it being detected that the solid-state disk is abnormally powered off, marking a block that is not fully written as an open block, filling a DUMMY content of an SLC data format into a next layer of data of the block marked as an open block to seal the block. When abnormal powering-off of the solid-state disk happens, then all of the blocks that are not fully written are marked as an open block, subsequently a DUMMY content of an SLC data format is filled into the next layer of the data of the block marked as an open block to seal the block, and simultaneously the information of the block is saved into the configuration information. When the power is on again, the configuration information is detected. When it is detected that the block is sealed by using the DUMMY content of the SLC data format, then the DUMMY content of the SLC data format is deleted, and subsequently the block is treated with the normal process.

In an embodiment of the present application, the detecting module is further configured for:

setting a timer, and, based on a time when the block starts to be written with data and a time when the timer arrives time, determining a maintaining duration of data of the block that is not fully written;

comparing the maintaining duration of the data of the block that is not fully written and a threshold duration; and in response to the maintaining duration of the data of the block that is not fully written being greater than the threshold duration, placing the block with the maintaining duration being greater than the threshold duration into the table.

In an embodiment of the present application, the writing-in module is further configured for:

filling a DUMMY content of a SLC data format into the next layer of the data of the block having the abnormal powering-off mark to seal the block.

Figure 3:
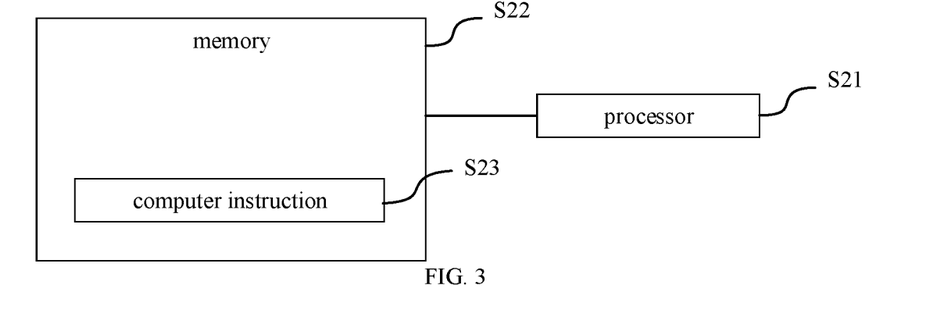
FIG. 3 is a schematic diagram of a computer device according to an embodiment of the present application.

In order to achieve the above object, the third aspect of the embodiments of the present application provides a computer device. FIG. 3 shows a schematic diagram of an embodiment of a computer device according to the present application. As shown in FIG. 3, the embodiment of the present application includes the following components:

at least one processor S21; and a memory S22, where the memory S22 stores a computer instruction S23 that is executable in the processor, and the instruction, when executed by the processor, implements the following operations:

S1: every preset duration, detecting whether a block in the solid-state disk is in a state of open block, and placing a block detected as in the state of open block into a table.

When the block in the solid-state disk is not fully written, after a certain duration, the data of the finally written-in layer of the block become unstable, which is referred to as the open-block situation. A timer may be provided, to sequentially determine the data maintaining duration of each of the blocks that are not fully written, among them, the data maintaining duration refers to the time difference between the time when the block starts to be written with data and the time point of the detecting by the timer. Subsequently, the maintaining duration and a preset threshold duration are compared. When the maintaining duration exceeds the preset threshold duration, then it is determined that the block is an open block, and subsequently the information of the block is placed into a table. When the maintaining duration does not exceed the preset threshold duration, then the block is not an open block, no processing is performed, and it is required to wait for the next round of detection.

S2: monitoring in real time whether a new record exists in the table.

S3: in response to it being monitored that a new record exists in the table, determining whether a block in the new record has an abnormal powering-off mark.

When the new record is generated, it is required to determine whether the block in the new record has the abnormal powering-off mark, and when abnormal powering-off happens, the block is marked.

S4: in response to the block in the new record having the abnormal powering-off mark, filling a content of a predetermined format into a next layer of data of the block having the abnormal powering-off mark to seal the block.

When the block does not have an abnormal powering-off mark, a DUMMY content of a data type in the current block is filled into the next layer of the data of the current block. When the block has an abnormal powering-off mark, then a DUMMY content of a Single-Level Cell (SLC, i.e., 1 bit/unit) data format is filled into the next layer of the data of the block having the abnormal powering-off mark to seal the block, and the information of the block is saved into the configuration information.

In an embodiment of the present application, the method further includes:

in response to a block in the new record not having the abnormal powering-off mark, filling a DUMMY content of a data type in a current block into a next layer of data of the current block. When the data type in the current block is data of the TLC format, then a DUMMY content of the TLC format is filled into the next layer of the data of the current block. When the data type in the current block is data of the SLC format, then a DUMMY content of the SLC format is filled into the next layer of the data of the current block.

In an embodiment of the present application, the method further includes:

in response to it being detected that the solid-state disk is abnormally powered off, marking a block that is not fully written as an open block, filling a DUMMY content of an SLC data format into a next layer of data of the block marked as an open block to seal the block. When abnormal powering-off of the solid-state disk happens, then all of the blocks that are not fully written are marked as an open block, subsequently a DUMMY content of an SLC data format is filled into the next layer of the data of the block marked as an open block to seal the block, and simultaneously the information of the block is saved into the configuration information. When the power is on again, the configuration information is detected. when it is detected that the block is sealed by using the DUMMY content of the SLC data format, then the DUMMY content of the SLC data format is deleted, and subsequently the block is treated with the normal process.

In an embodiment of the present application, the operation of, every preset duration, detecting whether the block in the solid-state disk is in the state of open block, and placing the block detected as in the state of open block into the table includes:

setting a timer, and, based on a time when the block starts to be written with data and a time when the timer arrives time, determining a maintaining duration of data of the block that is not fully written;

comparing the maintaining duration of the data of the block that is not fully written and a threshold duration; and in response to the maintaining duration of the data of the block that is not fully written being greater than the threshold duration, placing the block with the maintaining duration being greater than the threshold duration into the table.

In an embodiment of the present application, the step of, in response to the block in the new record having the abnormal powering-off mark, filling the content of the predetermined format into the next layer of the data of the block having the abnormal powering-off mark to seal the block includes:

filling a DUMMY content of a SLC data format into the next layer of the data of the block having the abnormal powering-off mark to seal the block.

Figure 4:
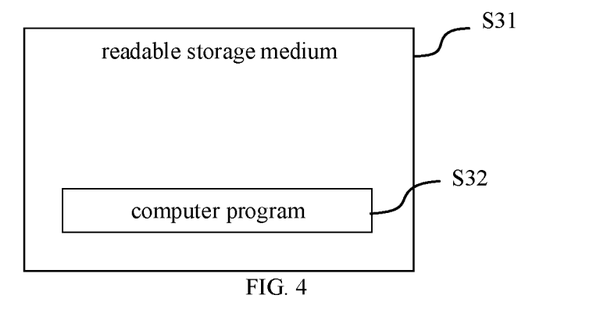
FIG. 4 is a schematic diagram of a computer-readable storage medium according to an embodiment of the present application.

In order to achieve the above object, the fourth aspect of the embodiments of the present application provides a computer-readable storage medium. FIG. 4 shows a schematic diagram of an embodiment of a computer-readable storage medium according to the present application. As shown in FIG. 4, the computer-readable storage medium S31 stores a computer program S32 that, when executed by a processor, implements the following operations:

every preset duration, detecting whether a block in the solid-state disk is in a state of open block, and placing a block detected as in the state of open block into a table;

monitoring in real time whether a new record exists in the table;

in response to it being monitored that a new record exists in the table, determining whether a block in the new record has an abnormal powering-off mark; and in response to a block in the new record having an abnormal powering-off mark, filling a content of a predetermined format into a next layer of data of the block having the abnormal powering-off mark to seal the block.

In an embodiment of the present application, the method further includes:

in response to the block in the new record not having the abnormal powering-off mark, filling a DUMMY content of a data type in a current block into a next layer of data of the current block.

In an embodiment of the present application, the method further includes:

in response to it being detected that the solid-state disk is abnormally powered off, marking a block that is not fully written as an open block, filling a DUMMY content of an SLC data format into a next layer of data of the block marked as an open block to seal the block.

In an embodiment of the present application, the operation of, every preset duration, detecting whether the block in the solid-state disk is in the state of open block, and placing the block detected as in the state of open block into the table includes:

setting a timer, and, based on a time when the block starts to be written with data and a time when the timer arrives time, determining a maintaining duration of data of the block that is not fully written;

comparing the maintaining duration of the data of the block that is not fully written and a threshold duration; and in response to the maintaining duration of the data of the block that is not fully written being greater than the threshold duration, placing the block with the maintaining duration being greater than the threshold duration into the table.

In a preferable embodiment of the present application, the operation of, in response to the block in the new record having the abnormal powering-off mark, filling the content of the predetermined format into the next layer of the data of the block having the abnormal powering-off mark to seal the block includes:

filling a DUMMY content of a SLC data format into the next layer of the data of the block having the abnormal powering-off mark to seal the block.

Furthermore, the method according to the embodiments of the present application may also be implemented as a computer program executed by a processor, where the computer program may be stored in a computer-readable storage medium. The computer program, when executed by the processor, executes the above-described functions defined in the method according to the embodiments of the present application.

Furthermore, the above-described method steps and system units may also be implemented by using a controller and a computer-readable storage medium that is used to store a computer program enabling the controller to execute the functions of the steps or units.

A person skilled in the art should understand that the discussion on any of the above embodiments is merely illustrative, and are not intended to imply that the scope (including the claims) of the embodiments of the present application is limited to those examples. With the concept of the embodiments of the present application, the embodiments or the technical features of different embodiments may be combined, and many other variations of different aspects of the embodiments of the present application as stated above may exist, which are not provided in detail for brevity. Therefore, any omissions, modifications, equivalent substitutions and improvements that are made within the spirit and the principle of the embodiments of the present application should fall within the protection scope of the embodiments of the present application.

The invention claimed is:

1. A method for optimizing an open block in a solid-state disk, comprising:
    every preset duration, detecting whether a block in the solid-state disk is in a state of open block, and placing a block detected as in the state of open block into a table;
    monitoring in real time whether a new record exists in the table;
    in response to it being monitored that the new record exists in the table, determining whether a block in the new record has an abnormal powering-off mark;
    in response to the block in the new record having the abnormal powering-off mark, filling a content of a predetermined format into a next layer of data of the block having the abnormal powering-off mark to seal the block; and in response to it being detected that the solid-state disk is abnormally powered off, marking a block that is not fully written as an open block, filling a DUMMY content of an SLC data format into a next layer of data of the block marked as an open block to seal the block.

2. The method according to claim 1, wherein the method further comprises:

in response to the block in the new record not having the abnormal powering-off mark, filling a DUMMY content of a data type in a current block into a next layer of data of the current block.

3. The method according to claim 1, wherein every preset duration, detecting whether the block in the solid-state disk is in the state of open block, and placing the block detected as in the state of open block into the table comprises:

setting a timer, and, based on a time when the block starts to be written with data and a time when the timer arrives time, determining a maintaining duration of data of the block that is not fully written;

comparing the maintaining duration of the data of the block that is not fully written and a threshold duration; and in response to the maintaining duration of the data of the block that is not fully written being greater than the threshold duration, placing the block with the maintaining duration being greater than the threshold duration into the table.

4. The method according to claim 1, wherein in response to the block in the new record having the abnormal powering-off mark, filling the content of the predetermined format into the next layer of the data of the block having the abnormal powering-off mark to seal the block comprises:

filling a DUMMY content of a SLC data format into the next layer of the data of the block having the abnormal powering-off mark to seal the block.

5. A computer device, wherein the computer device comprises:

at least one processor; and a memory, wherein the memory stores a computer instruction that is executable in the processor, and the instruction, when executed by the processor, implements operations comprising:

every preset duration, detecting whether a block in the solid-state disk is in a state of open block, and placing a block detected as in the state of open block into a table;

monitoring in real time whether a new record exists in the table;

in response to it being monitored that the new record exists in the table, determining whether a block in the new record has an abnormal powering-off mark;

in response to the block in the new record having the abnormal powering-off mark, filling a content of a predetermined format into a next layer of data of the block having the abnormal powering-off mark to seal the block; and in response to it being detected that the solid-state disk is abnormally powered off, marking a block that is not fully written as an open block, filling a DUMMY content of an SLC data format into a next layer of data of the block marked as an open block to seal the block.

6. A non-transitory computer-readable storage medium, the computer-readable storage medium storing a computer program, wherein the computer program, when executed by a processor, implements operations comprising:

every preset duration, detecting whether a block in the solid-state disk is in a state of open block, and placing a block detected as in the state of open block into a table;

monitoring in real time whether a new record exists in the table;

in response to it being monitored that the new record exists in the table, determining whether a block in the new record has an abnormal powering-off mark;

in response to the block in the new record having the abnormal powering-off mark, filling a content of a predetermined format into a next layer of data of the block having the abnormal powering-off mark to seal the block; and in response to it being detected that the solid-state disk is abnormally powered off, marking a block that is not fully written as an open block, filling a DUMMY content of an SLC data format into a next layer of data of the block marked as an open block to seal the block.

7. The method according to claim 2, wherein in response to the block in the new record not having the abnormal powering-off mark, filling a DUMMY content of a data type in a current block into a next layer of data of the current block, comprises:

when the data type in the current block is data of a TLC format, filling a DUMMY content of the TLC format into the next layer of the data of the current block; and when the data type in the current block is data of a SLC format, filling a DUMMY content of the SLC format into the next layer of the data of the current block.

8. The method according to claim 1, wherein the method further comprises:

when the DUMMY content of the SLC data format is filled into the next layer of the data of the block marked as an open block to seal the block, saving information of the block into configuration information.

9. The method according to claim 8, wherein after saving information of the block into configuration information, the method further comprises:

when the power is on again, detecting the configuration information;

when it is detected that the block is sealed by using the DUMMY content of the SLC data format, deleting the DUMMY content of the SLC data format, and treating the block with a normal process.

10. The method according to claim 3, wherein the method further comprises:

when the maintaining duration does not exceed the threshold duration, performing no processing on the block, and waiting for a next round of detection.

11. The computer device according to claim 5, wherein the operations further comprise:

in response to the block in the new record not having the abnormal powering-off mark, filling a DUMMY content of a data type in a current block into a next layer of data of the current block.

12. The computer device according to claim 5, wherein the operation of every preset duration, detecting whether the block in the solid-state disk is in the state of open block, and placing the block detected as in the state of open block into the table comprises:

setting a timer, and, based on a time when the block starts to be written with data and a time when the timer arrives time, determining a maintaining duration of data of the block that is not fully written;

comparing the maintaining duration of the data of the block that is not fully written and a threshold duration; and in response to the maintaining duration of the data of the block that is not fully written being greater than the threshold duration, placing the block with the maintaining duration being greater than the threshold duration into the table.

13. The computer device according to claim 5, wherein the operation of in response to the block in the new record having the abnormal powering-off mark, filling the content of the predetermined format into the next layer of the data of the block having the abnormal powering-off mark to seal the block comprises:

filling a DUMMY content of a SLC data format into the next layer of the data of the block having the abnormal powering-off mark to seal the block.

14. The computer device according to claim 11, wherein the operation of in response to the block in the new record not having the abnormal powering-off mark, filling a DUMMY content of a data type in a current block into a next layer of data of the current block, comprises:

when the data type in the current block is data of a TLC format, filling a DUMMY content of the TLC format into the next layer of the data of the current block; and when the data type in the current block is data of a SLC format, filling a DUMMY content of the SLC format into the next layer of the data of the current block.

15. The computer device according to claim 5, wherein the operations further comprise:

when the DUMMY content of the SLC data format is filled into the next layer of the data of the block marked as an open block to seal the block, saving information of the block into configuration information.

16. The computer device according to claim 15, wherein after the operation of saving information of the block into configuration information, the operations further comprise:

when the power is on again, detecting the configuration information;

when it is detected that the block is sealed by using the DUMMY content of the SLC data format, deleting the DUMMY content of the SLC data format, and treating the block with a normal process.

17. The computer-readable storage medium according to claim 6, wherein the operations further comprise:

in response to the block in the new record not having the abnormal powering-off mark, filling a DUMMY content of a data type in a current block into a next layer of data of the current block.

18. The computer-readable storage medium according to claim 6, wherein the operation of every preset duration, detecting whether the block in the solid-state disk is in the state of open block, and placing the block detected as in the state of open block into the table comprises:

setting a timer, and, based on a time when the block starts to be written with data and a time when the timer arrives time, determining a maintaining duration of data of the block that is not fully written;

comparing the maintaining duration of the data of the block that is not fully written and a threshold duration; and in response to the maintaining duration of the data of the block that is not fully written being greater than the threshold duration, placing the block with the maintaining duration being greater than the threshold duration into the table.

19. The computer-readable storage medium according to claim 6, wherein the operation of in response to the block in the new record having the abnormal powering-off mark, filling the content of the predetermined format into the next layer of the data of the block having the abnormal powering-off mark to seal the block comprises:

filling a DUMMY content of a SLC data format into the next layer of the data of the block having the abnormal powering-off mark to seal the block.

20. The computer-readable storage medium according to claim 17, wherein the operation of in response to the block in the new record not having the abnormal powering-off mark, filling a DUMMY content of a data type in a current block into a next layer of data of the current block, comprises:

when the data type in the current block is data of a TLC format, filling a DUMMY content of the TLC format into the next layer of the data of the current block; and when the data type in the current block is data of a SLC format, filling a DUMMY content of the SLC format into the next layer of the data of the current block.

* * * * *